(12) United States Patent
Smirnov et al.

(10) Patent No.: US 9,626,555 B2
(45) Date of Patent: Apr. 18, 2017

(54) CONTENT-BASED DOCUMENT IMAGE CLASSIFICATION

(71) Applicant: ABBYY Development LLC, Moscow (RU)

(72) Inventors: Anatoly Smirnov, Moscow (RU); Vasily Panferov, Moscow Region (RU); Andrey Isaev, Moscow Region (RU)

(73) Assignee: ABBYY DEVELOPMENT LLC, Moscow (RU)

( * ) Notice: Subject to any disclaimer, the term of this patent is extended or adjusted under 35 U.S.C. 154(b) by 108 days.

(21) Appl. No.: 14/571,766

(22) Filed: Dec. 16, 2014

(65) Prior Publication Data

US 2016/0092730 A1    Mar. 31, 2016

(30) Foreign Application Priority Data

Sep. 30, 2014 (RU) ................................ 2014139557

(51) Int. Cl.
*G06K 9/00* (2006.01)

(52) U.S. Cl.
CPC ..... *G06K 9/00456* (2013.01); *G06K 9/00463* (2013.01); *G06K 9/00483* (2013.01)

(58) Field of Classification Search
None
See application file for complete search history.

(56) References Cited

U.S. PATENT DOCUMENTS

| | | | | |
|---|---|---|---|---|
| 2004/0013302 A1* | 1/2004 | Ma | ................ | G06K 9/00463 382/209 |
| 2005/0223313 A1* | 10/2005 | Geraud | ................ | G06K 9/2054 715/255 |
| 2009/0074288 A1* | 3/2009 | Nishida | ................ | G06K 9/00456 382/159 |
| 2013/0236111 A1* | 9/2013 | Pintsov | ................ | G06K 9/00483 382/224 |
| 2014/0307959 A1* | 10/2014 | Filimonova | ................ | G06K 9/00449 382/159 |

* cited by examiner

*Primary Examiner* — Vu Le
*Assistant Examiner* — Delomia L Gilliard
(74) *Attorney, Agent, or Firm* — Lowenstein Sandler LLP

(57) ABSTRACT

Methods, systems, and apparatus, including computer programs encoded on a computer storage medium, for classifying one or more document images based on its content by determining blocks layout of the document image; recognizing the document image to obtain digital content data representing text content or the potential graphical content of the image; calculating feature values of the document image for features based on the digital content data and the blocks layout; and classifying the document image as belonging to one of document classes based on the calculated feature values.

27 Claims, 3 Drawing Sheets

CONTENT-BASED DOCUMENT IMAGE CLASSIFICATION

CROSS REFERENCE TO RELATED APPLICATION

This application claims the benefit of priority to Russian Patent Application No. 2014139557, filed Sep. 30, 2014; disclosure of which is incorporated herein by reference in its entirety.

BACKGROUND OF THE INVENTION

Field of the Invention

The present invention relates in general to classification of images using Optical Character Recognition (OCR) technologies.

Description of the Related Art

In today's society, a wide variety of different kinds of documents are being used. The documents may be text-only, may contain text with various pictures, such as photographs, illustrations, or other graphical content, or may contain only graphical contents, depending on the documents' type and/or their usage. There is a need to automatically classify documents according to their types. Before classifying paper-based documents, these documents are usually processed to generate their digital representations (images). For example, paper-based documents may be scanned or photographed to generate their electronic image. Subsequently the images are classified. Such classification is an essential part of processing a stream of documents including various document types.

In general, a variety of methodologies may be used for classifying obtained images. Image classification can be based, for example, on an analysis of geometrical structures within the digital images. Some classification methodologies utilize mathematical morphological analysis. Some features, such as graphical features, may be identified within images and thereby an assumption may be made about the document containing some textual contents or some other type of contents. In some embodiments, if it is determined that the document image contains text, this text is subsequently recognized to obtain digital content of the document an ASCII code representation of the text.

Existing methods of document classification are often unreliable and inefficient. A continuing need exists for the advancement of classification methodologies that result in more efficient and reproducible classification of images across a wide variety of document types.

SUMMARY OF THE DESCRIBED EMBODIMENTS

In general, one aspect of the subject matter described in this specification can be embodied in methods that include the actions of accessing a set of features stored in memory; analyzing the document image to determine blocks layout; recognizing the document image to obtain digital content data representing text content or the potential graphical content; calculating feature values of the document image for one or more features from the set of features, wherein the feature values are based on the digital content data and the blocks layout; and classifying the document image as belonging to one of document classes from a set of document classes based on the calculated feature values. Other implementations of this aspect include corresponding systems, apparatus, and computer programs.

These and other aspects can optionally include one or more of the following features. The method can further comprise accessing a set of document classes and one or more sets of template images for at least one of the document classes; analyzing the template images to determine block layouts; recognizing the template images; computing class feature values based on results of the analyzing of the template images and on results of the recognizing of the template images; and storing the class feature values in the memory; wherein the classifying the document image as belonging to one of classes is based at least in part on the class feature values. The classifying the document image as belonging to one of classes from a set of document classes can further comprise calculating one or more confidence levels for the document image belonging to one or more classes from the set of document classes. The method can further comprise performing preliminary processing of the document image to improve visual quality of the document image before the image analyzing and the image recognition steps, or calculating for at least one feature in the set of features a probability of the at least one feature being present in the one of the document classes; and calculating overall probability of the document image belonging to the one of the document classes. The probabilities of one or more particular features can be weighted differently from the other features. The classifying of the document can further include storing the assessed probability of the at least one of the set of features in a classification database.

These and other aspects can optionally include one or more of the following additional features. Accessing the set of features can include accessing a library of at least one of: relative spatial positioning of text content, a frequency of word occurrence, an amount of numbers in an image, an amount of lexicalized words on a page, an amount of present barcodes, an amount of the vertical/horizontal separators, a ratio of objects in the page, a vertical text orientation, at least one key word, and a location of an object within the image, as at least one of the set of features. Classifying the document as belonging to the selected one of the set of document classifications can further include classifying the document into a graphical-only document, a text-only document, or a combination text and graphical document.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
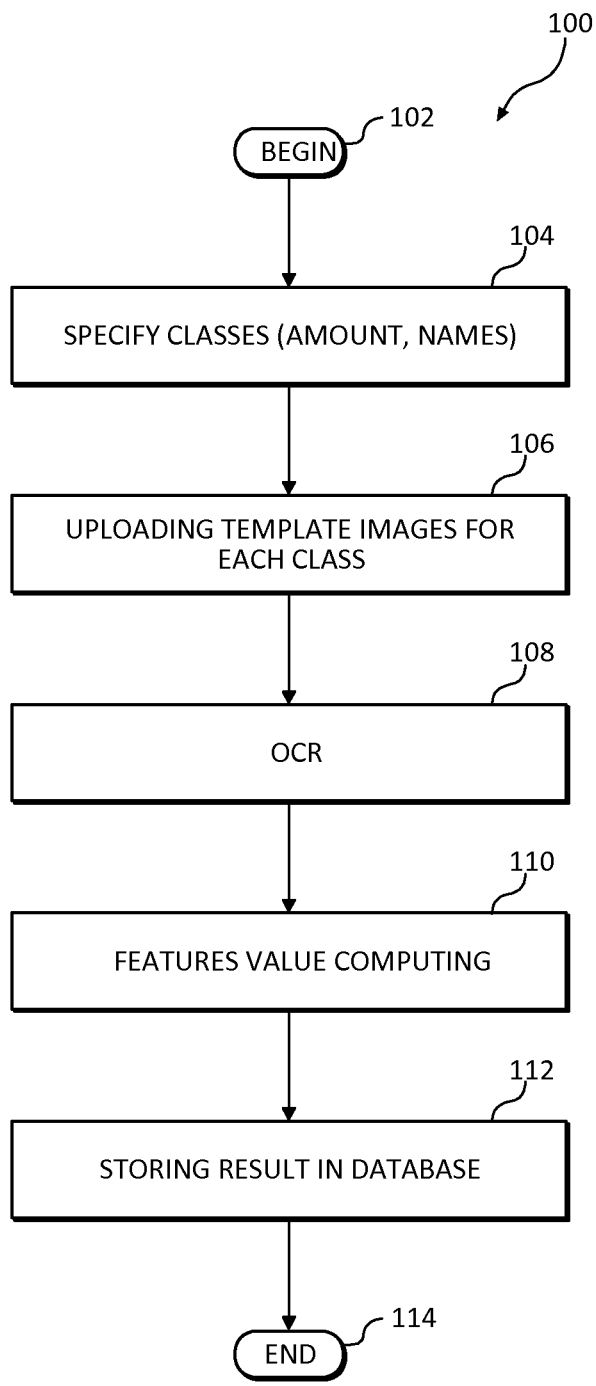
FIG. 1 is a flow chart diagram of an exemplary method for content-based document image classification, in which aspects of the present invention may be realized.

As previously mentioned, the implementation and use of documents in today's society in a variety of forms has continued to proliferate. Identification documents, licenses, checklists, contracts, and the like are found in virtually every facet of life. Many of today's documents contain a wide variety of content, including text (whether generated (printed) or hand-written), photographic content, illustrations, and other graphical content. Some documents include only graphical content (pictures or photos) without any textual content. It may be a photo of a person or digital picture of a landscape. The documents may be paper-based or electronic. Usually paper based documents are processed to obtain their digital representations (i.e. images) by, for example, scanning or photographing the document. Hereafter the term <<document image>> will refer to a digital representation of a paper-based document irrespective of the document's content (textual, graphical or mixed content).

While some solutions are in place for classification of document images, there currently is no effective mechanism for organizing documents using classification based on predefined features identified as a result of recognition process. In addition, a continuing need exists for the advancement of classification methodologies that result in more efficient and repeatable organization of document images across a wide variety of types.

To address this need, a variety of mechanisms of illustrated embodiments are provided that promote classification of document images in various forms based on predetermined features calculated based on the OCR results, as will be explained further. As previously mentioned, with regard to these predetermined features, in one embodiment, a set of predetermined features stored in memory is accessed. If it is needed before usage of the described method the document is optically scanned to obtain digital representation of the document—document image. The document image is recognized by an OCR engine. Features are computed based on the results of OCR. The image of document is classified as belonging to a selected one type of the document.

As described above the mechanisms of the illustrated embodiments implement Optical Character Recognition (OCR) technologies, whereby the results of such OCR operations are then used for classification of document images into one of a number of predetermined classes.

An uploaded document image is processed through OCR, values for one or more features are computed based on the obtained result of image recognition, and then document image is referred to one of the predetermined classes based on the computed values for one or more of the predetermined features, or one or more combinations of the predetermined features. The functionality implemented by these mechanisms may be installed and implemented by a variety of devices, including personal computers (PC) devices (desktop or laptop), mobile devices such as tablets and smartphones, and other computing devices.

Moreover, document images may be classified in bunches of document pages or into groups of images of particular types based on the combination of predetermined features. The features may be used in a training stage (i.e., stage for training the classification system to determine a classification model), and then for the actual classification (i.e., using the classification model).

Stored in memory features may be binary or range. Binary features reflect the fact of presence or absence of a particular feature in the recognition results, for example as "YES"/"NO" or "0"/"1". Range features store information in ranges: [0, . . . , 1] or [2, . . . , 5]. Various thresholds for the predetermined features values may be set by a user, set by the system, or otherwise. Separate thresholds may be used for the training and operational (classification) stages. In additional embodiments, the thresholds may correspond to a predetermined range of features values. For example, threshold values for feature <<an amount of vocabulary words>> may be set in ranges: 0 . . . 1; 2 . . . 5; and greater than 5. As one of ordinary skill in the art will appreciate, ranges may differ based on feature and assignment. For example, a certain structured document such as a drivers license may be expected to have between two and three words in the field of the driver's name.

As was mentioned above, various feature values for later classification purposes are computed based on the results of the document image recognition (e.g., OCR). In other words, initially, if needed, the paper-based document is processed to receive its digital representation (paper-based document may be scanned or photographed). Then obtained digital image is recognized to look for inherent features in the document, with the features computed from the recognized data. For one or more inherent features, which are calculated based on the results of recognition of the image, in one exemplary embodiment, a probability of finding these features in a particular class of document images is calculated. Accordingly, as a result, the most important (i.e., probable) features may then be selected. The overall probability of the feature belonging to a particular class may be computed for each feature. In other words, all computed features may be used following the OCR process to attribute a particular image to a particular class.

Consider the following example. The mechanisms of the illustrated embodiments may be implemented for the purposes of classifying documents delivered to an insurance company. Insurance-related documents may be voluminous and varying in amount and format. For example, some documents may be written contracts, others may include photos or other illustrations, and yet others may be receipts. Each of these documents may be delivered en masse to a particular location for processing. The mechanisms of the illustrated embodiments may enable the classification of each of these types of documents (photos, receipts, contracts) in an efficient and repeatable manner. In a related embodiment, a prospective insurance customer may deliver a number of enrollment documents to an insurance organization for pre-processing or qualification purposes. If needed, delivered documents are processed to generate their digital representations. Using the classifier functionality of the illustrated embodiments, the mixed packet of documents may be organized into each of the document's constituent classes, such as passport photo, signed contract, payment information, and the like.

In one specific embodiment, the mechanisms of the illustrated embodiments implement use of OCR and subsequent processing received results for dividing a group of document images at least into two separate groups. The first may be a document image including a photo (or scan) of a text-based document, and the second may be an image-only file (i.e., picture without textual content). In this embodiment, at least one feature may be used for classification, namely the presence of text in the image. In other words the instant embodiment implements mechanisms to classify documents on the basis of the presence of text in the results of image recognition.

The predetermined feature "text presence in the image" allows for classifying text-based document images aside from picture-based document images (image of document that contains only graphical information, e.g. pictures, illustration or photos) on a per se basis upon classification, thereby improving image classification as a whole. For this classification, "amount of words" may also be used as a predetermined feature for classification purposes. One of ordinary skill in the art will appreciate that the mechanisms may be applied on document content as a whole (i.e., whole page content), as well as on portions of content within the document (i.e., portions of the page as subdivided).

As previously described, the mechanisms of the illustrated embodiments utilize recognized data (OCR results), and compare that recognized data against predetermined features or a combination of predetermined features, e.g. presence of feature is identified in the recognized data and a value for this feature is calculated. These mechanisms, then, apply classification methodologies based directly on the results of OCR process itself, rather than from other processes such as morphological analysis of the document. And again, as previously described, in one embodiment, the mechanisms is implemented in a training stage (where the classifier is trained using template images for each class, for example) and a classification stage (where the classifier performs the classification against new received document images based on the results of the training stage).

One purpose of document classification is to assign documents to different predefined categories. This classification is very useful when dealing with a document flow that includes documents of various types, and an identity of the type of each document need be determined. For example, it may be desirable to sort the various documents such as contracts, invoices, and receipts into different folders, or rename them according to their types. This sorting may be done automatically with a pre-trained system.

In one embodiment a classification database is created. This database is created during the training stage automatically, by the user, with the user involvement, or in other ways known to one of ordinary skill in the art. Several images of documents of each type may be uploaded. It is desirable that the documents have similar content. These images are used to create the classification database. Scanned images or photos may need some preprocessing before the images can be used for database creation. Moreover during the training stage the set of predetermined features may be expanded by adding new features. These new features may be generated automatically by machine learning or manually by the user.

The classification database is then used in a classification stage to classify various incoming document images. Images (scans and/or photographs) of documents may be fed, for example, to a pre-trained classification system that uses the classification database to determine the applicable type of each document.

Turning now to FIG. 1, a flow chart diagram of exemplary content-based image classification 100 is depicted, in which various aspects of the illustrated embodiments may be implemented. Method 100, among other functionality, is concerned with the initialization aspects of the classification mechanisms (i.e., the training stage previously described), such as the creation of the classification database, for example.

Method of creating classification database 100 begins (step 102) with the specification of various classes (step 104). As previously indicated, and as one of ordinary skill in the art will appreciate, the classes may be specified by a user, by the system, by a combination of the user and system, or by another mechanism. In addition, the classes themselves may vary according to a particular implementation such as by amount and/or name.

The described method classifies document images using a classification database. Here the term <<document>> refers not only to the documents that contains only textual content but also to the documents containing mixed content (textual and graphical content) and to the document including only pictures (photo of a person or a landscape, for example). To create a classification database, a set of template images is needed for each type of documents to be processed. So paper-based document are preliminary processed to obtain their digital representations (document images). Continuing to step 106, method 100 uploads template images for each of the classes into the classification system (step 106). The template image may be a composite representation of various predefined features that the document image will be ultimately associated with. For each class in a particular classification model, for example, a differing template image may be associated and/or uploaded. In one embodiment of step 106, a user may upload several image samples (some n template images) of each predetermined class to be used for training the classifier. For example, three respective images may be used per class. The template images are typically representative of the classes and contain all representative features for the class with which they belong. As previously mentioned, images in a particular class should look similar in terms of appearance and/or content, and may need some pre-processing steps. These images are then in-turn used to create the classification database.

In some implementations template images used for database creation are preliminary preprocessed to eliminate some distortions, such as incorrect orientation, geometrical distortions or other defects.

In some implementations classification database represents the list of identifiers (names) of classes of document images. Each of the class identifiers is linked to a list of predetermined features wherein frequency of occurrence of a certain features in the document of particular class will be stored.

In some implementations the template image undergoes an image analysis (document analysis) process. During image analysis a logical structure (blocks layout) of the template image is determined. The analysis may comprise generating one or more image hypothesis for the whole image, verifying each hypothesis by generating block hypotheses for each block in the image based on the image hypothesis; and selecting a best block hypothesis for each block. The best image hypothesis is then selected based on a degree of correspondence between the selected best block hypotheses for the image. During the document analysis process typically various areas are identified in the document image, their sizes and positions are saved to memory, and their classes are detected based on their content, such as text, picture, table, chart, or noise. Detailed description of the document analysis can be found in U.S. Pat. No. 8,260,049, which is incorporated hereby by reference in its entirety.

In a further step 108, the template image undergoes an OCR process. OCR systems are used to transform images or representations of paper documents (photos) into computer-readable and computer-editable and searchable electronic files. As a result of recognition of an image, information about the text (if text is found within the image), such as font used in the document image, text's coordinates, and coordinates of the rectangles enclosing different words, pictures blocks, separators, etc. is obtained.

Based on the results of recognition (OCR) of the template document images the preliminary determined features are ascertained, e.g. the presence of some features is identified and the values of these features are computed (110). For example, the features value computing may determine an amount of numbers, an amount of lexicalized words, a frequency of word occurrence, a relative dimension of a page layout, etc., as the recognized data to be standardized with the image template for the predetermined feature or features. This valued information may be presented in list form or in another format. Computed features' values will be later used in the classification stage to assign the incoming document images to certain classes. In other words, the recognized data undergoes certain features value computing to assign values to the features; in effect creating the predetermined features to be used later in the classification stage (step 110). The calculated predetermined features are then stored in the classification database as previously described (step 112).

For example, based on the results of recognition of template document image, number of dictionary words in the document image is calculated. For instance, amount of dictionary words within recognized data is equal 3. As the feature "amount of dictionary words" is a range feature, the computed value for determined feature "amount of dictionary words" is assigned to an appropriate range [2 , . . . , 5]. Also a counter for frequency of occurrences of certain features in a certain class is updated, namely it will increased by 1. In such way classification database is formed based on the results of recognition of template images.

As one of ordinary skill in the art will appreciate, the various steps 104-112 as described above and in method 100 may be repeated, for example, if a quality of classification is not high enough to work out a best classification model using a proper combination of features for one or more particular sample images. The method 100 then ends (step 114).

As previously stated, aspects of method 100 may be thought of as the training stage, which may be used to train, based on template document images the classification model (classification methodology) to be used subsequently during the classification of new incoming images in real time.

The classification database may be updated and improved, for example, by adding new types of documents or changing existing ones. In one embodiment, a user may predetermine an amount and a name of classes, and a feature/combination of features to be used upon training, and further upon classification (step 104). An option to add custom features may be useful when classifying unique images. In addition, custom features may be added via a specific Graphical User Interface (GUI).

The update option may be useful if a classification database has been already created, but a user wants to fine-tune it or to add more classes. These methods can also be used to enhance the classification scenario with user-defined or custom features. As was mentioned above, this method allows you to add custom features for a document in the database. Feature is defined by its name, and the user can add more than one feature for one document image. An example, where using custom features improves classification result, is when document images are not reliably distinguished by standard classification method, but it is known that the documents of one class always have a company logo in an upper left corner, while the documents of the other class do not have such logo. Adding the absence/presence of logo as one of the features improves quality of classification for such document images.

As one of ordinary skill in the art will appreciate, aspects of images that are selected to be predetermined features for later purposes of document classification may vary widely according to a particular situation. In one embodiment, four primary features may be implemented, including a frequency of word occurrence, an amount of numbers or digits (numerals) in an image, an amount of lexicalized words on a page, and relative dimensions of page layout (e.g., size of bounding rectangle enclosing text on the page).

In addition to the four primary features described previously, additional features may be used singularly, and/or in combination in a particular situation. These additional features include, but are not limited to the following: an amount of words in the image document, an amount of barcodes, an amount of tables, and amount of vertical/horizontal separators, (if there is no barcode, table, or separator present, the value of such feature will be zero) a percentage ratio of the objects in the page, a content of barcodes (key boards in barcode), and the like. Vertical text orientation may also be considered upon determining such features as key word or amount of words. In addition, mutual location of objects within the image may be used as a feature. Finally, another feature may include a presence of a photograph, picture, illustration or other graphical object within the image (for example, referring to photography of a person within the scan of a passport). As suggested above, this listing of possible features is not exhaustive and may be expanded in according to a specific situation or purpose in the classification methodology.

In forming the classification model, in one exemplary embodiment, the results of the training stage may be tested. This allows for selection of the most exact classification scheme possible for a particular situation. For example, from each designated class, a set of random images may be selected (e.g., about 80%). The remaining approximately 20% of images may be used for testing (validating) the classification model. These remaining images are then used to evaluate an accuracy of the classification model based on the selected features. If the remaining approximately 20% (taken randomly) are found to be classified as they were originally classified (for example as by a user), then the particular classification model may be considered as validated, and may be assumed to be safely used for classification of subsequent incoming images. Alternatively, if the model is found to have classified the remaining images with any accompanying errors, the model may then be retrained.

Figure 2:
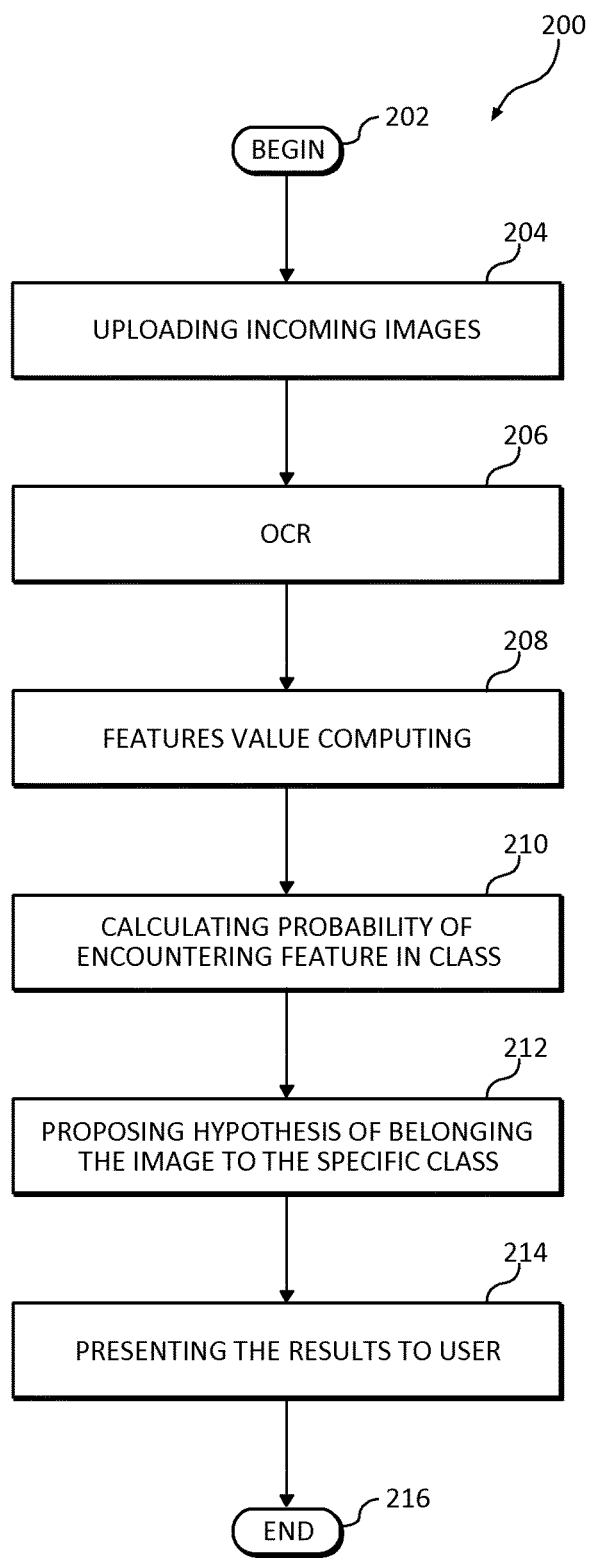
FIG. 2 is a flow chart diagram of an additional exemplary method for content-based document image classification according to the mechanisms of the present invention.

FIG. 2, following, is a flow-chart diagram that details various aspects of what may be termed an exemplary classification stage as method 200. In one embodiment, the classification operations performed are based on one, or a combination of, predetermined features that are computed based on the recognition results of the images to be examined. Following beginning step 202, the method 200 handles incoming images, which are uploaded 204 into the classifier, for example. At this step in the classification stage, the image (or set of images) to be assigned to a particular class is acquired. These incoming images may be acquired randomly to the classification system. In the case of multi-page documents, classification may be made based on the first page of the document or based on the information regarding each page of the document in accordance with the user settings.

Uploaded incoming images to be classified may be pre-processed to prepare them for further processing or to improve their visual quality (e.g. after scanning or prior to recognition). This pre-processing step is optional and may be skipped. Pre-processing of the images may be performed at training and/or at classification stage. Pre-processing steps may allow to improve results of the image recognition process. Images may be subjected to additional pre-processing, such as: auto-detection of page orientation; automated image de-skewing, image despeckling; splitting pages of scanned books into two separate images; splitting scanned pages with multiple business cards into separate images; lines straightening; texture filtering; removing motion blur and ISO noise from digital photos; clipping page margins, etc.

A recognition (OCR) process is applied to each of the acquired/uploaded images in step 206, following. Based on the results of recognition 206 in a similar way to the step of calculating features values 110 described previously, the values of each of the features of the instant document are calculated (step 208) (for example, frequency of word occurrence, amount of numbers or digits (numerals) in the image, amount of lexicalized words on the page, relative dimension(s) of page layout, are calculated in the results of recognition of images, etc.).

In step 210, following, a probability $P(F_i|C_k)$ of encountering the calculated feature $F_i$ in a particular class $C_k$ is calculated. Such probabilities are calculated for each class $C_k$ of images. So for the class $C_1$ the following probabilities are calculated: $P(F_1|C_1), P(F_2|C_1), \ldots, P(F_N|C_1)$. After the calculating probabilities $P(F_i|C_k)$ of encountering the calculated feature $F_i$ in a particular class $C_k$, the overall probability is calculated to assign the document image to a certain class if this document image has some set of computed features.

At step 212 the following formula (Naïve Bayes classifier) may be used to determine the probability to assign the image of document to the class $C_k$, if the features $F_1, \ldots, F_n$ are given.

$$P(C_k | F_1, \ldots, F_n) = \frac{1}{Z} p(C_k) \prod_{i=1}^{n} p(F_i | C_k)$$

where Probability $p(F_i|C)$—conditional probability of presence features $F_i$ in class $C_k$—is computed based on the results obtained from the previous training stage;

$$P(Fi | Ci) = \frac{p(Fi | Ci)}{p(Fi | Ci) + p(Fi | Ci \text{ others})},$$

—is a normalization constant It should be noted that while the stated classifier may be used, a variety of algorithms of classification may be implemented depending on a particular situation. Other classifier techniques may be used at this step.

In one embodiment, some selected features may be weighted more heavily. This allows for the determination of the most necessary features, the presence of which may identify the applicable classification of a particular incoming image faster and more effective. This may be computed by the following formula:

$$\frac{1}{Z} p(C_k)$$

where p(Fi|Ci) probability to find feature Fi in Class $C_i$, p(Fi|Ci others) probability to find feature Fi in other classes (not $C_i$). So if the p(Fi|Ci others)=0, the probability P(Fi|Ci)=1, if the probability p(Fi|Ci others)≠0, the probability P(Fi|Ci)≤1. For example, the feature "presence of word <passport>" may occur mostly in class "scans of passports", so the p(Fi|Ci others)–>0, then the probability to find feature presence of word "passport" in class of "scan of passport" is almost 1.

The determination of assignment of the document (image) to particular type (class) may be performed with some probability (confidence). The classification method returns the names of the classes to which the image can belong. For each class the classification confidence is also saved, and the names are sorted by confidence value in descending order. In other words, based on the computed probability $p_i(C_k|F_1, \ldots, F_n)$ the hypothesis of assigning incoming image to existing class is proposed. Also several hypotheses may be supposed (step 212). For example, hypothesis H1, that with probability 85% the incoming images should be included in Class 1, hypothesis H2, that with probability 10% the incoming images should be included in Class 2, hypothesis H3, that with probability 5% the incoming images should be included in Class 3.

An additional, optional, step 214 may be performed after the completion of the classification operations, when, for example, the classifier detects a possibility of classification error. The classifier then provides the user with the notification of the possible error and displays the set of classified documents (images) with probability. The method 200 then ends (step 216).

Here, as previously, steps 202-214 may be repeatedly performed, either individually or collectively, or as one of ordinary skill in the art will appreciate, in another order, depending on a particular situation and particular features/combination of features.

Consider the following example of classification functionality as performed by the mechanisms of the illustrated embodiments. In the example, the set of resultant images are to be classified into two classes: images (photos) of the documents containing textual or mixed content information and document images representing only pictures. The particular features used in this example is the amount of words in the recognized image. As a first step, the threshold value of the feature (the amount of words) is predetermined by the user. Next, the image is uploaded in the application. An OCR is applied to the uploaded file. The OCR is applied to recognize the image content, bar codes and other non-text portions of the context. In the result of the OCR (if text is found within the image), the information about the text, the font used in the document image, the text's coordinates, and the coordinates of the rectangles enclosing different words are obtained. In a following step, the value for this features (the amount of words) is calculated in the recognized image (page or the whole document). If the amount of words is more than the threshold predetermined by the user the file is classified as "image" (photo, scan, etc.) of the document containing textual or mixed information. If the amount of words is less than the threshold predetermined by the user the file is classified as the "image-only" file, e.g. image of document representing only graphical information (pictures). The classification may be made with certain probability and the additional of optional user notification of possible false classification may be provided.

Figure 3:
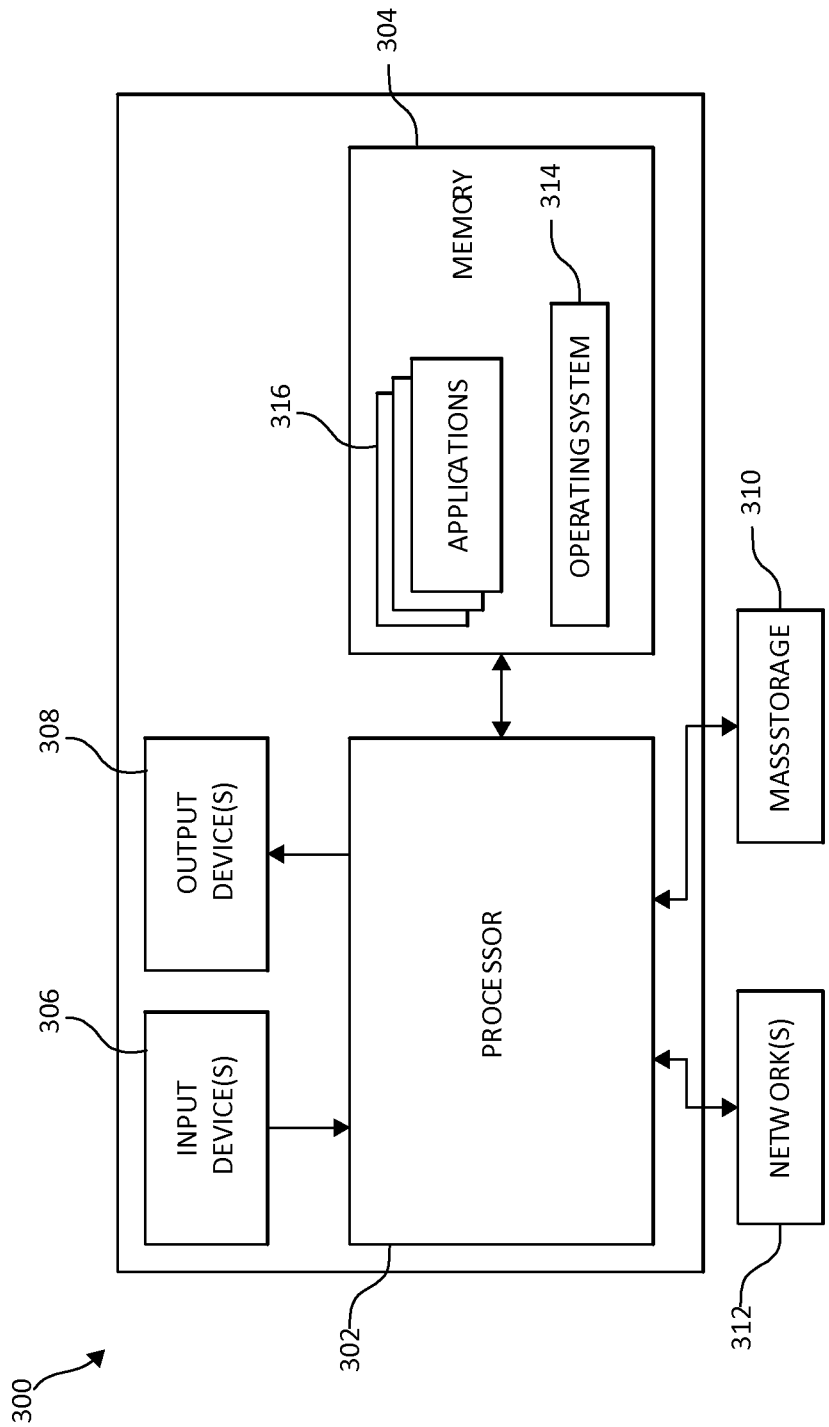
FIG. 3 is a block diagram of various architecture, including a processor, that may be used to effect mechanisms of the present invention.

FIG. 3, following, is a block diagram that illustrates an exemplary computer system 300 that in some implementations is used with the present invention, as described above. The system 300 includes one or more processors 302 connected to a memory 304. The processor(s) 302 may contain one or more computer cores or may be a chip or other device capable of performing computations (for example, a Laplace operator may be produced optically). The memory 304 may be random access memory (RAM) and may also contain any other types or kinds of memory, particularly non-volatile memory devices (such as flash drives) or permanent storage devices such as hard drives, etc. In addition, an arrangement can be considered in which the memory 304 includes remotely located information-storage media, as well as local memory such as cache memory in the processor(s) 302, used as virtual memory and stored on an external or internal permanent memory device 310.

The computer system 300 also usually includes input and output ports to transfer information out and receive information. For interaction with a user, the computer system 300 may contain one or more input devices 306 (such as a keyboard, a mouse, a scanner, or other) and output devices 308 (such as displays or special indicators). The computer system 300 may also have one or more permanent storage devices 310 such as an optical disk drive (CD, DVD, or other), a hard disk, or a tape drive. In addition, the computer system 300 may have an interface with one or more networks 312 that provide connection with other networks and computer equipment. In particular, this may be a local area network (LAN) or a Wi-Fi network, and may or may not be connected to the World Wide Web (Internet). It is understood that the computer system 300 may include analog and/or digital interfaces between the processor 302 and each of the components 304, 306, 308, 310 and 312.

The computer system 300 is managed by an operating system 314 and includes various applications, components, programs, objects, modules and other, designated by the consolidated number 316.

The programs used to accomplish the methods corresponding to this invention may be a part of an operating system or may be a specialized peripheral, component, program, dynamic library, module, script, or a combination thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

What is claimed is:

1. A method for classifying a document image based on its content using a processor device, comprising:
    accessing a set of features stored in memory;
    analyzing the document image to determine blocks layout;
    recognizing the document image to obtain digital content data representing text content or potential graphical content;
    calculating, based on one or more features from the set of features accessed in the memory, feature values of the document image for the one or more features from the set of features, wherein the feature values are based on the digital content data and the blocks layout; and
    classifying the document image as belonging to a document class from a set of document classes based on the calculated feature values.

2. The method of claim 1, further comprising:
    accessing the set of document classes and one or more sets of template images for at least one of the document classes;
    analyzing the template images to determine block layouts;
    recognizing the template images;
    computing class feature values based on results of the analyzing of the template images and on results of the recognizing of the template images; and
    storing the class feature values in the memory;
    wherein the classifying the document image as belonging to the document class from the set of document classes is based at least in part on the class feature values.

3. The method of claim 1, wherein the classifying the document image as belonging to the document class from the set of document classes further comprises calculating one or more confidence levels for the document image belonging to one or more classes from the set of document classes.

4. The method of claim 1, further comprising:
    performing preliminary processing of the document image to improve visual quality of the document image before the image analyzing and the image recognition steps.

5. The method of claim 1, wherein classifying the document image as belonging to the document class from the set document classes further comprises:
    calculating for at least one feature in the set of features a probability of the at least one feature being present in the one of the document classes; and
    calculating overall probability of the document image belonging to the one of the document classes.

6. The method of claim 5, wherein the probabilities of one or more particular features are weighted differently from other features.

7. The method of claim 5, wherein classifying the document further includes storing the calculated probability of the at least one of the set of features in a classification database.

8. The method of claim 1, wherein accessing the set of features includes accessing a library of at least one of:
    relative spatial positioning of text content,
    a frequency of word occurrence,
    an amount of numbers in an image,
    an amount of lexicalized words on a page,
    an amount of present barcodes,
    an amount of vertical/horizontal separators,
    a ratio of objects in the page,
    a vertical text orientation,
    at least one key word, and
    a location of an object within the image,
    as at least one of the set of features.

9. The method of claim 1, wherein classifying the document as belonging to the document class of the set of document classes further includes classifying the document into a graphical-only document, a text-only document, or a combination text and graphical document.

10. A system for classifying a document image based on its content comprising: a machine-readable storage device having instructions stored thereon; and data processing apparatus operable to execute the instructions to perform operations comprising:
    accessing a set of features stored in memory;
    analyzing the document image to determine blocks layout;
    recognizing the document image to obtain digital content data representing text content or potential graphical content;
    calculating, based on one or more features from the set of features accessed in the memory, feature values of the document image for the one or more features from the set of features, wherein the feature values are based on the digital content data and the blocks layout; and
    classifying the document image as belonging to a document class from a set of document classes based on the calculated feature values.

11. The system of claim 10, further comprising
    accessing the set of document classes and one or more sets of template images for at least one of the document classes;
    analyzing the template images to determine block layouts;
    recognizing the template images;
    computing class feature values based on results of the analyzing of the template images and on results of the recognizing of the template images; and
    storing the class feature values in the memory;
    wherein the classifying the document image as belonging to the document class from the set of document classes is based at least in part on the class feature values.

12. The system of claim 10, wherein the classifying the document image as belonging to the document class from the set of document classes further comprises calculating one or more confidence levels for the document image belonging to one or more classes from the set of document classes.

13. The system of claim 10, further comprising
performing preliminary processing of the document image to improve visual quality of the document image before the image analyzing and the image recognition steps.

14. The system of claim 10, wherein classifying the document image as belonging to the document class from the set of document classes further comprises
calculating for at least one feature in the set of features a probability of the at least one feature being present in the one of the document classes; and
calculating overall probability of the document image belonging to the one of the document classes.

15. The system of claim 14, wherein the probabilities of one or more particular features are weighted differently from other features.

16. The system of claim 14, wherein classifying the document further includes storing the calculated probability of the at least one of the set of features in a classification database.

17. The system of claim 10, wherein accessing the set of features includes accessing a library of at least one of:
relative spatial positioning of text content,
a frequency of word occurrence,
an amount of numbers in an image,
an amount of lexicalized words on a page,
an amount of present barcodes,
an amount of vertical/horizontal separators,
a ratio of objects in the page,
a vertical text orientation,
at least one key word, and
a location of an object within the image,
as at least one of the set of features.

18. The system of claim 10, wherein classifying the document as belonging to the document class of the set of document classes further includes classifying the document into a graphical-only document, a text-only document, or a combination text and graphical document.

19. A non-transitory storage device having instructions for classifying a document image based on its content stored thereon that, when executed by data processing apparatus, cause the data processing apparatus to perform operations comprising:
accessing a set of features stored in memory;
analyzing the document image to determine blocks layout;
recognizing the document image to obtain digital content data representing text content or the potential graphical content;
calculating, based on one or more features from the set of features accessed in the memory, feature values of the document image for the one or more features from the set of features, wherein the feature values are based on the digital content data and the blocks layout; and
classifying the document image as belonging to a document class from a set of document classes based on the calculated feature values.

20. The non-transitory storage device of claim 19, further comprising
accessing the set of document classes and one or more sets of template images for at least one of the document classes;
analyzing the template images to determine block layouts;
recognizing the template images;
computing class feature values based on results of the analyzing of the template images and on results of the recognizing of the template images; and
storing the class feature values in the memory;
wherein the classifying the document image as belonging to the document class from the set of document classes is based at least in part on the class feature values.

21. The non-transitory storage device of claim 19, wherein the classifying the document image as belonging to the document class from the set of document classes further comprises calculating one or more confidence levels for the document image belonging to one or more classes from the set of document classes.

22. The non-transitory storage device of claim 19, further comprising:
performing preliminary processing of the document image to improve visual quality of the document image before the image analyzing and the image recognition steps.

23. The non-transitory storage device of claim 19, wherein classifying the document image as belonging to the document class from the set of document classes further comprises
calculating for at least one feature in the set of features a probability of the at least one feature being present in the one of the document classes; and
calculating overall probability of the document image belonging to the one of the document classes.

24. The non-transitory storage device of claim 23, wherein the probabilities of one or more particular features are weighted differently from other features.

25. The non-transitory storage device of claim 23, wherein classifying the document further includes storing the assessed probability of the at least one of the set of features in a classification database.

26. The non-transitory storage device of claim 19, wherein accessing the set of features includes accessing a library of at least one of:
relative spatial positioning of text content,
a frequency of word occurrence,
an amount of numbers in an image,
an amount of lexicalized words on a page,
an amount of present barcodes,
an amount of vertical/horizontal separators,
a ratio of objects in the page,
a vertical text orientation,
at least one key word, and
a location of an object within the image,
as at least one of the set of features.

27. The non-transitory The storage device of claim 19, wherein classifying the document as belonging to the document class of the set of document classes further includes classifying the document into a graphical-only document, a text-only document, or a combination text and graphical document.

* * * * *